(No Model.)
T. B. STILLMAN.
PROCESS OF MANUFACTURING WATER GAS.
No. 377,695. Patented Feb. 7, 1888.
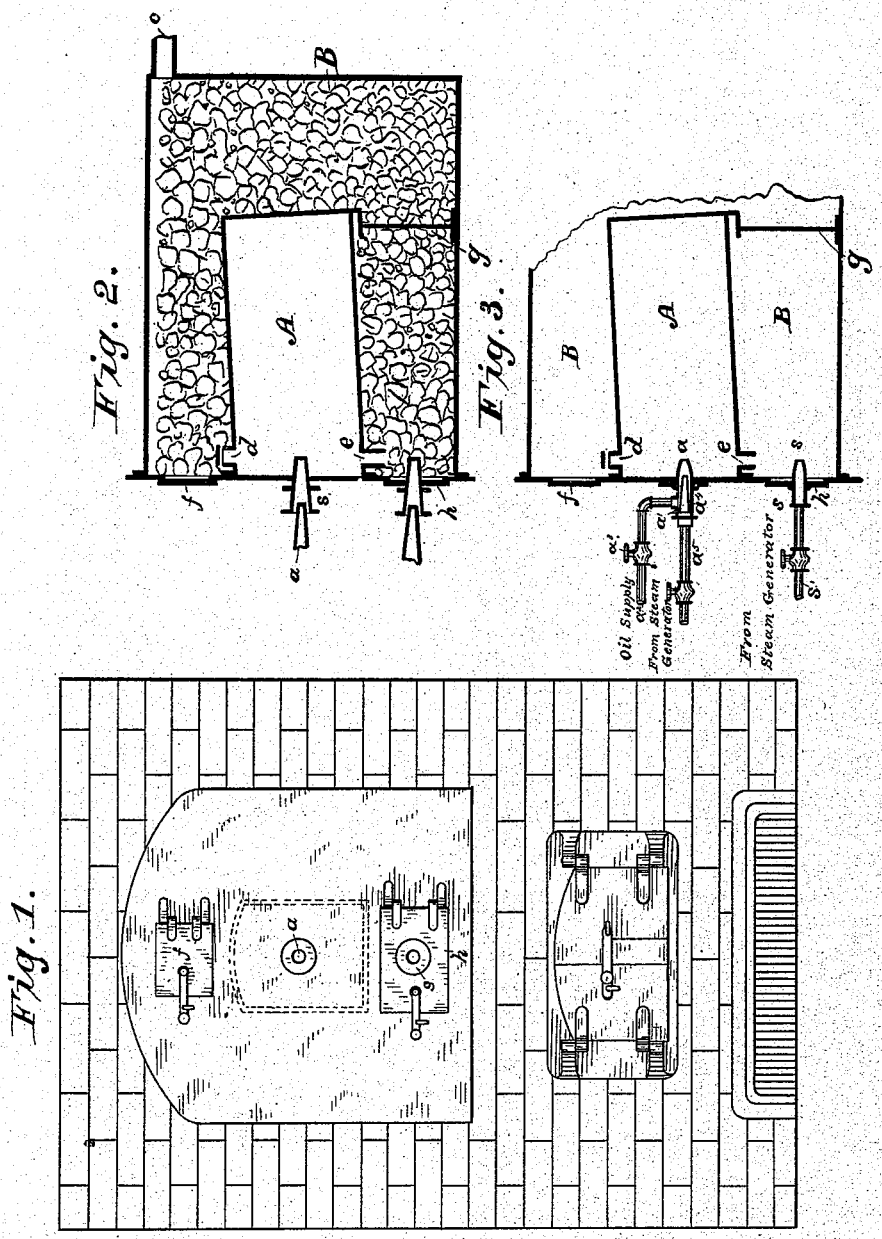
WITNESSES
Edwin A. Newman
Chr. M. Newman
INVENTOR
Thomas B. Stillman,
By his Attorneys
Baldwin, Hopkins & Peyton

UNITED STATES PATENT OFFICE.

THOMAS B. STILLMAN, OF HOBOKEN, NEW JERSEY, ASSIGNOR OF THREE-FOURTHS TO CHARLES B. HARRIS, OF NEW YORK, N. Y.

PROCESS OF MANUFACTURING WATER-GAS.

SPECIFICATION forming part of Letters Patent No. 377,695, dated February 7, 1888.

Original application filed March 25, 1886, Serial No. 196,575. Divided and this application filed September 21, 1886. Serial No. 214,208. (No model.)

*To all whom it may concern:*

Be it known that I, THOMAS B. STILLMAN, a citizen of the United States, and a resident of the city of Hoboken, in the county of Hudson and State of New Jersey, have invented a new and Improved Process of Manufacturing Illuminating-Gas, of which the following is a specification.

The purpose of my invention is to manufacture a new fixed illuminating-gas, and more especially to make such gas directly from a liquid hydrocarbon.

The fixed gas made according to my method is different in its constituent parts from any gas heretofore known, so far as I am aware, in that it contains more hydrocarbon and less hydrogen and carbonic oxide. Petroleum consists of a series of hydrocarbons volatile at different temperatures, the lighter passing off first at quite a low temperature, while to volatilize the last of the heavy hydrocarbons requires between a red and white heat. If too great a heat is used in the retorts, the lighter hydrocarbons are decomposed into free hydrogen and carbon and marsh-gas ($CH_4$) producing a very weak illuminating-gas. Where the temperature in the retort is at the proper heat a luminous gas, called "oil-gas," may be made from petroleum and most liquid hydrocarbons. Oil-gas, however, by itself is not a desirable illuminating-gas, since to produce it to the best advantage only a moderate heat can be used in the retorts, making a gas too rich in illuminating properties. To overcome this difficulty and also to increase the bulk of gas manufactured from oil, two processes have been devised—first, the manufacture of gas by heating oil and steam in the same retort; second, mixing oil-gas and water-gas after each has been manufactured separately.

In the first method the hydrocarbon oil and steam are decomposed, producing first carbonic acid ($CO_2$) and hydrogen. To form a combustible illuminating-gas, however, by this method, either of two conditions seems necessary—first, the heat in the retort being sufficient to liberate a portion of the carbon from the oil decomposes the steam and forms carbonic acid and hydrogen, and the remainder of the heavier hydrocarbons being vaporized, but not decomposed, forms an illuminant, so that the hydrogen and vaporized oil burn with a yellow flame; or, second, if the carbonic acid is converted into carbonic oxide, then there must be a great excess of free carbon to effect the decomposition, and this carbon must be deposited from the hydrocarbon. This means the necessary use of a large amount of oil, and the high temperature required to produce said carbon from the heavier portion of the oil causes the destructive distillation of the larger portion of the oil. For these reasons I consider this method unsatisfactory and expensive.

The second process is simply the impregnation of water-gas with naphtha and the passage of the same through heated retorts. A permanent fixed illuminating-gas cannot be made in this way, since the retorts cannot be heated to such a temperature as to cause chemical action to take place without converting the naphtha into hydrogen and marsh gas, &c., and at any lower temperature than that required for the above-mentioned reaction no change takes place, and the gas goes into the receivers as water-gas mixed mechanically with naphtha as the illuminant. The separation of the naphtha from the water-gas by condensation in the gas-mains is, as is well known, a serious objection to the use of such gas.

My improved process consists in the distillation or production of a gas or gases from hydrocarbon oil by volatilizing the lighter hydrocarbon gases, subjecting such gases when mixed with steam to heat in the presence of solid carbonaceous material—such, for instance, as coal or coke—and at the same time volatilizing the heavier hydrocarbons by the application of a higher degree of heat, and heating the gases from the latter distillation when mixed with steam in the presence of carbonaceous material.

In the operation of my invention the hydrocarbon vapors and steam, being passed through incandescent carbon at the proper temperature, are decomposed into carbonic acid and hydrogen, the former of which, by reason of the presence of the heated carbon, is immediately decomposed into carbonic oxide (CO.) In this operation the carbon comes from the coal, and the heated steam, hydrocarbons, and carbon or coal act together to produce ethylene, as is done under similar conditions when coal-gas is made by heating in retorts bituminous coal composed of carbon, moisture, and hydrocarbons. It will therefore be seen that my improved method is different from either of the ordinary methods above described. There is no destructive distillation of the oil used, and the invention may therefore be practiced with economy, and the resulting gas is a pure fixed illuminating-gas of good quality.

The operation is fully described below.

Any suitable organization of apparatus or retorts for carrying out my process may of course be adopted. That shown in the drawings is deemed by me suitable, practical, and efficient, and I prefer to employ it. No claim is, however, made herein to such apparatus, as it constitutes the subject-matter of another application, of which this case is a division.

In the drawings, Figure 1 is a front elevation of a furnace for carrying out my improved process. Fig. 2 is a longitudinal section through the gas-converting retorts, and Fig. 3 is a detail view showing an ordinary construction which may be adopted for the injectors.

In the construction shown two retorts are used, one, A, being located inside the other, B. The outside retort is filled with coke or coal or any other suitable carbonaceous material capable of converting steam into hydrogen and carbonic oxide. Coke is preferred. This retort may be set in any convenient way in a furnace, and should be heated at a temperature to keep the material inside the retort at the proper heat—i. e., the lowest possible capable of converting the steam into hydrogen and carbonic oxide—as, for instance, at a temperature of from 3,500° to 4,000° Fahrenheit.

The retort A is arranged inside the retort B, with its rear end slightly higher than its front end, for the purpose of allowing any of the heavy vapors and condensed or tarry matter of the oil not decomposed in the retort A to run out of the opening $e$ into the retort B. At $d$, near the front upper end of the retort A, is an opening to allow the lighter hydrocarbon gases to pass into B, and thence through the exit $c$ to the receivers.

$f$ and $h$ represents doors for the introduction of coke into the retort B.

$g$ represents standards or supports upon which the retort A is supported. Oil is introduced or injected into the retort A, preferably in the form of a spray, by an injector located at $a$. I also, by preference, inject steam into this retort, preferably commingled with the oil, by the injector $a$.

It should be understood that the coke placed over the top of the inner retort, A, should be heated to the lowest possible point to produce the reaction desired there, and not heated as highly as the coke which is under the retort A, and which requires the higher heat there for the purpose of decomposing the tarry and other matter at that point.

The retort A is heated to such a temperature—as, for instance, 900° to 1,500° Fahrenheit—that the lighter illuminating hydrocarbons are not "cracked up" into marsh-gas and hydrogen, (non-illuminants,) as is usual; but after being volatilized from the oil pass from the rear end of the retort A, and returning to the front enter the retort B at $d$. If steam has been injected into the retort A with the oil, as I prefer to do, then the mingled light hydrocarbon vapors and steam will together pass into the retort B. If, however, the steam is injected into the retort B and there mingles with the light hydrocarbon vapors, the operation will be about the same, though perhaps not so perfect, as when the oil and steam are injected together into the retort A. The combined hydrocarbon vapors and steam are, in the presence of heated coke or other carbonaceous material, heated to such a temperature, (the lowest possible to produce a proper chemical change)—say about 4,000° Fahrenheit—that the steam is decomposed to the proper degree and its hydrogen unites with the partially-decomposed hydrocarbons of the oil to form a series of light hydrocarbon gases. In other words, the hydrogen of the steam under these conditions does not remain isolated as hydrogen, but forms a true hydrocarbon—such, for instance, as the production of acetylene $C_2H_2$ (or ethylene $C_2H_4$) in the manufacture of gas as ordinarily made from coal by the heating of the heavy hydrocarbons of coal in the presence of moisture from the coal converted into steam in the retorts. The fixed gas produced in this manner from the series of lighter hydrocarbons distilled from the retort A contains a comparatively small amount of hydrogen and more illuminating hydrocarbons than gas manufactured by the processes now in use. The residuum or heavy hydrocarbon vapors mixed with steam in the retort A, which run into the retort B at $e$, pass from the retort over and through the heated or ignited carbonaceous material to the exit $c$ and is converted into a fixed gas varying in richness according to the heat employed and the amount of steam converted into carbonic oxide and hydrogen. Steam, preferably superheated, is injected at $s$ to reduce the luminosity of the gas to the required degree, and the amount of steam employed in the retort B may be regulated by the supply injected at this point.

The outer pipe or nozzle, $a'$, of the injector is connected, by a pipe, $a^2$, having a suitable regulating-cock, $a^3$, therein, with any suitable oil-reservoir, the pipe being marked "Oil-supply."

$a^4$ indicates the interior steam-nozzle, and the pipe $a^5$ connected thereto leads to any suitable source of steam-supply, being marked "from steam-generator." The lower injector, $s$, has a pipe, $s'$, which also leads to a suitable source of steam-supply, and is marked "from steam-generator."

This invention is not based upon or limited to any specific form of injectors. Any suitable injector may be employed—such, for instance, as that shown in patent of Napier, No. 173,327; or any of the forms of the Giffard injector, adapted to inject oil and steam into a retort or vessel, may be used.

I make no claim herein to the process of manufacturing gas from hydrocarbon, which consists in introducing the hydrocarbon into a retort otherwise free from pressure, distilling the gases from the hydrocarbon without subjecting them to pressure, and then subjecting said gases, when mixed with steam, to heat in the presence of heated or ignited carbonaceous material; nor, broadly, to the process of separating the oils into light and heavy portions before distillation, distilling the light portion at one temperature, fixing the gas produced therefrom by heating it, when mixed with steam, in the presence of heated carbonaceous material, and then drawing it off into a suitable receiver, distilling the heavier portion of the oil, heating the gases resulting therefrom when mingled with steam in the presence of heated carbonaceous material, and drawing off the gas into a suitable receiver, as such subjects-matter are claimed in another pending application filed by me June 9, 1887, No. 240,784. Nor do I make herein any claim, broadly, to the continuous operation in which the light gases are driven off at a relatively low temperature, and at the same time the heavier gases at a relatively higher temperature, as such a method constitutes the subject-matter of an application filed by me August 17, 1887.

I claim herein as my invention—

The process of producing a permanent illuminating-gas from liquid hydrocarbons, which consists in volatilizing the lighter hydrocarbon gases from the liquid hydrocarbon, then subjecting said gases, when combined with steam, to heat in the presence of heated or ignited solid carbonaceous material to decompose the steam and unite its hydrogen with the partially-decomposed hydrocarbons of the oil to form a series of light hydrocarbon gases, and drawing off the gases thereby produced into a receiver, and at the same time by the application of a higher degree of heat volatilizing the heavier hydrocarbon gases from the residuum left from the above operation, subjecting such gases, when mixed with steam, to heat in the presence of heated or ignited carbonaceous material, and then drawing off the gas thus produced into a receiver.

In testimony whereof I have hereunto subscribed my name.

THOMAS B. STILLMAN.

Witnesses:
C. B. HARRIS,
NESTOR PONCE DE LEON.